United States Patent [19]
Tidwell, Jr.

[11] 3,871,227
[45] Mar. 18, 1975

[54] NAIL TURNING APPARATUS
[76] Inventor: Carl E. Tidwell, Jr., 5800 Riverview Rd., Mableton, Ga. 30059
[22] Filed: Nov. 26, 1973
[21] Appl. No.: 419,219

[52] U.S. Cl.................... 72/476, 227/155, 144/318
[51] Int. Cl. .............................................. B21c 3/16
[58] Field of Search ......... 72/476, DIG. 1; 227/155, 227/151, 152; 29/34 B, 283, 526, 432, 432.2; 269/296; 144/318

[56] References Cited
UNITED STATES PATENTS
| | | | |
|---|---|---|---|
| 1,503,339 | 7/1924 | Shields | 29/283 |
| 3,673,671 | 7/1972 | Petersen | 29/526 |

FOREIGN PATENTS OR APPLICATIONS
| | | | |
|---|---|---|---|
| 499,619 | 6/1930 | Germany | 227/155 |

Primary Examiner—Richard J. Herbst
Assistant Examiner—Robert M. Rogers
Attorney, Agent, or Firm—Jones, Thomas & Askew

[57] ABSTRACT

A nail turning plate to be placed adjacent a structure through which nails are driven and which turns the nail ends. The nail turning plate has a number of peaks separated by surfaces which slope downwardly from these peaks to form valleys. A nail turning plate includes an area filled with a number of contiguous peaks and valleys, so that a nail is turned as a result of impingement any where on the area.

2 Claims, 3 Drawing Figures

PATENTED MAR 18 1975  3,871,227

NAIL TURNING APPARATUS

This invention relates in general to nailing apparatus and in particular to apparatus for turning nail ends which protrude through a workpiece.

Anyone who has ever driven a nail through a workpiece realizes that the pointed nail end which protrudes from the workpiece represents a safety hazard which must be eliminated. Protruding nail ends are typically rendered relatively safe through the well-known expedient of turning the nail ends over to lie more or less parallel to the surface of the workpiece. Those skilled in the art will recognize that a time-honored method of turning over nail ends consists simply of striking several hammer blows on the nail end in a direction substantially at right angles to the shank of the nail, so that the pointed protruding end of the nail is bent approximately 90° to a position substantially parallel with the surface of the workpiece.

Although protruding nail ends can be effectively turned over by the aforementioned technique of manually hammering each individual nail end, it will be apparent that this technique is time-consuming and entirely inadequate for any nailing application where more than only a few nail ends are to be turned. Manual turning of nail ends is particularly inappropriate in production nailing environments, where a certain type of structural assembly or subassembly is repetitively manufactured. Such production arrangements typically use power-driven nail guns which are capable of driving nails rapidly and with minimum physical effort. The savings in time gained through the use of power nailing equipment, particularly in combination with a production manufacturing set-up where jigs are provided to position the members being nailed, is wasted if the protruding nail ends must be manually turned over.

It has been proposed in the prior art to place a flat plate of steel beneath the members being nailed together, so that the protruding end of a power-driven nail will strike the steel plate and, being unable to penetrate the plate, will necessarily be turned over to lie alongside the workpiece. The use of a flat steel plate has been less than satisfactory in actual practice, however, since the protruding nail end strikes the plate at substantially a perpendicular relation which is as likely to deform the nail end as it is to accomplish the desired turning over.

It has also been suggested in certain types of prior-art nailing applications to provide a nail-turning anvil arrangement in predetermined relation with the location of nailing, with the anvil having a predetermined contour to receive and guide the protruding nail end toward a turned-over position. A well-known example of such an anvil arrangement is found in the conventional paper stapler. While anvils of this type are useful in fastening applications where the nail, staple, or other fastener is always driven through the workpiece in a fixed location, so that an anvil can be located in a predetermined position to receive and to turn the protruding end of the fastener, many production nailing situations simply do not permit the design and use of specialized fixed-location anvil arrangements which can turn a nail end only if the protruding nail end is accurately aligned with a specific location of the anvil.

Accordingly, it is an object of the present invention to provide improved nail turning apparatus.

It is another object of the present invention to provide nail turning apparatus which functions with random alignment relative to one or more nails to be turned.

It is still another object of the present invention to provide nail turning apparatus which deflects nail ends toward a turned-over position.

The foregoing and other objects of the present invention, as well as many attendant advantages thereof, will become more readily apparent from the following description of an illustrative disclosed embodiment, including the drawing in which.

Stated in general terms, the nail turning apparatus of the present invention comprises a plate made of a material which is not readily penetrable by nails or similar fasteners and which has an overall surface contour approximately congruent with the contour of the adjacent surface through which a nail is to be driven. The surface of the nail turning plate has a number of elevated regions which define peaks on the surface, with each of the peaks being universally surrounded by nail turning surfaces which descend to a relatively lower position in contiguous relation to an adjacent nail turning surface.

Figure 1:
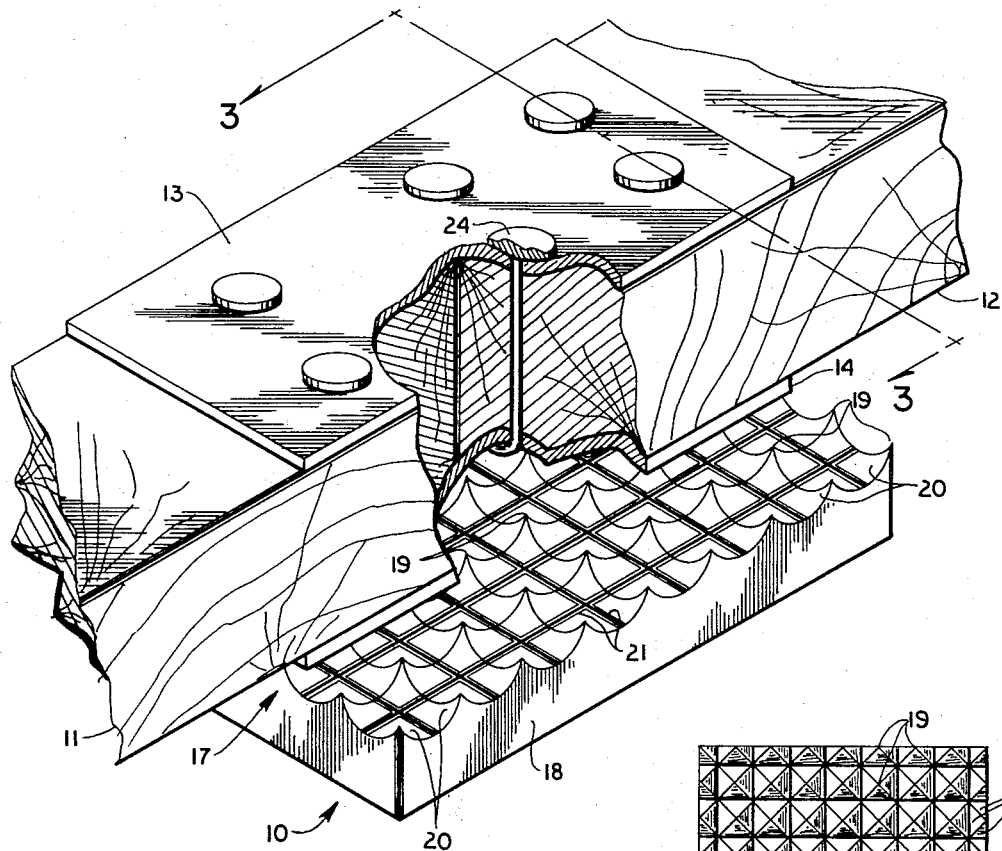
FIG. 1 shows an isometric view of a disclosed embodiment of the present invention positioned in operating relation with a workpiece shown partially broken-away.

The present invention is more particularly shown with reference to the disclosed illustrative embodiment, wherein FIG. 1 shows a nail turning plate indicated generally at 10 and positioned alongside a workpiece through which nails have been driven and turned by the plate. The workpiece being nailed in the illustrative embodiment is a pair of wooden studs 11 and 12 having butted ends to be joined together, with the butt joint being covered on opposite sides by the plates 13 and 14. The studs 11 and 12 may be conventional 2×4 members which are being assembled to form a prefabricated building truss assembly, by way of example, and the plate 13 and 14 in such an assembly would typically be metal plates to provide the necessary strength of the butt joint. It will be understood that the specific type of structural member or joint being nailed is described herein merely to illustrate an application of the present invention, and is not intended as a limitation on the invention.

The nail turning plate 10 must be impenetrable to power-driven nails or like fasteners to be turned, and the nail turning plate typically is made of a metal such as steel. The plate includes a base portion 18, and has a nail turning surface 17 including a number of peaks 19 which extend upwardly from the base portion. The nail turning surface 17 of the plate 10 is preferably positioned in contact with the proximate structural member being nailed, such as the plate 14 in the disclosed embodiment, and it can be seen that the extremities of the peaks 19 define a surface which is substantially congruent in contour to the contour of the plate 14 surface being nailed. The typical case is shown in FIG. 1 where the adjacent surface of the plate 14 has a plane contour, and so the ends of the peaks 19 substantially lie on an imaginary plane surface. If the plate 14 presented a curved surface facing the nail turning plate 10, however, then the peaks 19 should define a similar curved surface for best nail turning results.

Descending from each of the peaks 19 are the arcuate surfaces 20, which descend from each peak to a relatively lower location 21. It should be understood that the terms "lower" and "peak" are used herein to denote relative locations of the peaks 19 and the locations 21, rather than denoting an absolute limitation as to the elevation or orientation of the nail turning plate 10. The nail turning plate could as well be used in an overhead location inverted from that as depicted in FIG. 1, for example, with the peaks 19 facing downwardly toward a nail-driving gun.

Figure 2:
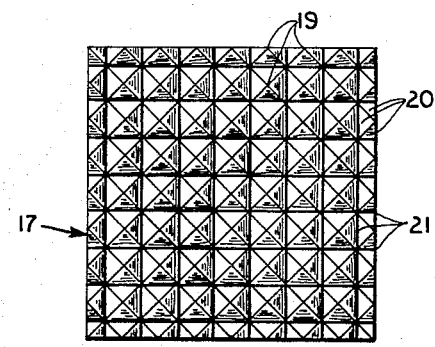
FIG. 2 shows a plan view of the nail turning apparatus of FIG. 1.
Figure 3:
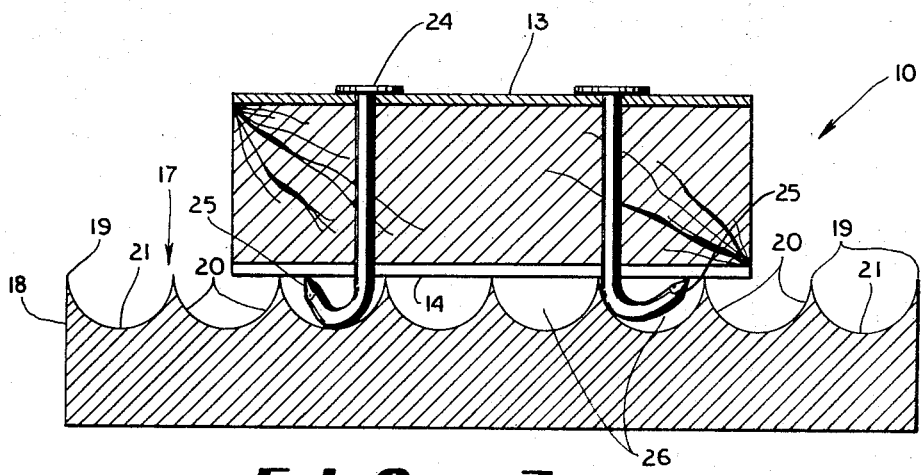
FIG. 3 shows a side elevation view of the disclosed nail turning apparatus.

Each of the arcuate surfaces 20 has a generally concave contour, as seen in FIG. 3, so that each arcuate surface terminates at a lower location 21 in substantially contiguous relation with the lower termination of an adjoining arcuate surface 20. It is particularly apparent in FIG. 1 that each of the peaks 19 (except for the peaks located on the perimeter of the nail turning plate) is universally surrounded by a number of the arcuate surfaces 20. The overall surface area of the nail turning surface 17, as seen in FIG. 2, preferably should be somewhat greater than the area defining the region into which nails or like fasteners will be driven, so that precise positioning of the nail turning plate will not be required. In the illustrative embodiment, for example, the area of the nail turning plate 17 is depicted as being somewhat greater than the corresponding area of the plate 14.

Turning to the operation of the invention as shown in the disclosed embodiment, it is assumed that the nail turning plate 10 is positioned with the nail turning surface 17 confronting an adjacent surface such as the plate 14, through which one or more nails or like fasteners is to be driven. As a nail 24 passes through one of the studs 11 and 12 to emerge from the plate 14, the pointed end 25 of the nail contacts the nail turning surface 17 of the plate 10. If the pointed end 25 contacts one of the arcuate surfaces 20, the end of the nail is deflected by the non-perpendicular contact of the nail with the arcuate surface so that the pointed end is turned back toward the plate 14. This turning of the nail end is depicted in FIG. 3. If the nail 24 is driven through the plate 14 and directly contacts one of the peaks 19, the forcible impingement of the pointed nail end 25 against the peak 19 will almost necessarily deflect the pointed nail end away from the peak 19 and downwardly along one of the arcuate surfaces which surround the peaks 19 in all directions. The pointed end 25 thus "descends" an arcuate surface 20 and is correspondingly bent by the shape of the arcuate surface, irrespective of the absence of any specific prepositioning of the nail turning surface 17. This bending action imparted to the pointed end 19 will continue downwardly to the end of a particular arcuate surface 20, at a lower position 21, and if a sufficient length of the nail is driven to extend beyond the plate 14, bending of the end 25 continues as the end proceeds upwardly along the next-contiguous one of the arcuate surfaces 20. In this manner, the pointed end 25 may be deflected in a partial circle to lie alongside or be pointing toward the plate 14. In nailing applications where the plate 14 (or other confronting surface) is of wood or another material readily penetrable by the pointed end 25, use of the present nail turning plate may actually cause the pointed end 25 to re-enter the contiguous surface being nailed.

Although the lower locations 21 comprise only a small portion of the total nail-turning area of the plate 10, it is possible that chance alignment of a nail 24 will place the pointed end 25 in direct perpendicular contact with one of the lower locations 21 so that the nail-bending force imparted by contact with an arcuate surface 20 is not immediately provided. Bending of the pointed ends 25 is nevertheless provided in most instances, since the open space 26 between the plate 14 and the lower position 21 enables bending of the pointed end to result from continued driving of the nail.

Since the nail turning surface 17 presents a repetitive pattern of peaks 19 and arcuate surfaces 20, it is apparent that a workpiece to be nailed can simply be randomly positioned on the nail turning plate without need for specific positioning or alignment for nail turning.

The nail turning surface 17 of the plate 10 may be made somewhat larger than the plate 14 or other workpiece to be nailed, to further minimize the need for attention to alignment. Where the nail turning plate of the present invention is used in conjunction with production line manufacture of nailed components, a nail turning plate can be provided on the production jig or other component-aligning structure, in appropriate backing relation with each nailing position.

It will be apparent that the foregoing relates only to an embodiment of the present invention, and that numerous alterations and modifications may be made therein without departing from the spirit and the scope of the invention as defined in the following claims.

What is claimed is:

1. A nail turning plate comprising:
   a nail impenetrable engaging member having a plurality of elevated regions which define peaks; and
   each of said peaks being universally surrounded by arcuate surfaces which descend from the peak to a relatively lower position in contiguous relation to the lower position of an arcuate surface which ascends to an adjacent one of said peaks.

2. A nail turning plate as in claim 1, wherein said contiguous relation between adjacent lower positions of said arcuate surfaces provides a substantially uninterrupted surface for turning a nail driven thereagainst.

* * * * *